(12) United States Patent
Her et al.

(10) Patent No.: US 12,551,850 B2
(45) Date of Patent: Feb. 17, 2026

(54) FUEL CELL MEMBRANE HUMIDIFIER

(71) Applicant: KOLON INDUSTRIES, INC., Seoul (KR)

(72) Inventors: Jung Kun Her, Seoul (KR); Do Woo Kim, Seoul (KR); Woong Jeon An, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 279 days.

(21) Appl. No.: 18/262,437

(22) PCT Filed: Mar. 8, 2022

(86) PCT No.: PCT/KR2022/003304
§ 371 (c)(1),
(2) Date: Jul. 21, 2023

(87) PCT Pub. No.: WO2022/191604
PCT Pub. Date: Sep. 15, 2022

(65) Prior Publication Data
US 2024/0088410 A1    Mar. 14, 2024

(30) Foreign Application Priority Data
Mar. 12, 2021 (KR) .................. 10-2021-0032467

(51) Int. Cl.
*B01D 63/02* (2006.01)
*H01M 8/04119* (2016.01)

(52) U.S. Cl.
CPC ........ *B01D 63/02* (2013.01); *H01M 8/04149* (2013.01); *B01D 2313/04* (2013.01); *B01D 2313/20* (2013.01); *B01D 2313/21* (2013.01)

(58) Field of Classification Search
CPC ................ B01D 63/02; B01D 2313/04; B01D 2313/20; B01D 2313/21; H01M 8/04149
See application file for complete search history.

(56) References Cited

U.S. PATENT DOCUMENTS

| 8,387,804 B2 | 3/2013 | Buck |
| 10,369,515 B2 | 8/2019 | Kanetsuki |
| (Continued) | | |

FOREIGN PATENT DOCUMENTS

| EP | 1 616 617 A1 | 1/2006 |
| EP | 4 266 434 A1 | 10/2023 |
| (Continued) | | |

OTHER PUBLICATIONS

Office Action from Korean Patent Office, dated Sep. 24, 2024.
(Continued)

*Primary Examiner* — Charles G Freay
(74) *Attorney, Agent, or Firm* — Harvest IP Law, LLP

(57) ABSTRACT

The present invention relates to a fuel cell membrane humidifier, which improves binding force between a potting part and an inner case, and thus can maintain the binding force even if a fuel cell is repeatedly operated and stopped. A fuel cell membrane humidifier according to an embodiment of the present invention includes: a humidification module for humidifying air, supplied from the outside, with the moisture of exhaust gas discharged from a fuel cell stack; and caps, which are each coupled to the both ends of the humidification module. The humidification module includes at least one cartridge having: an inner case; a plurality of hollow fiber membranes placed inside the inner case; and a potting part which fixes the ends of the plurality of hollow fiber membranes, and which is filled in and coupled to the end part of the inner case.

4 Claims, 3 Drawing Sheets

(56) References Cited

U.S. PATENT DOCUMENTS

2006/0113235 A1\* 6/2006 Strohm ................ B01D 63/089
                                                             210/232
2022/0123334 A1    4/2022 Kim

FOREIGN PATENT DOCUMENTS

| | | |
|---|---|---|
| JP | S62-187607 U | 11/1987 |
| JP | H08126823 A | 5/1996 |
| JP | 2004-255044 A | 9/2004 |
| JP | 4421827 B1 | 2/2010 |
| JP | 2019155303 A | 9/2019 |
| KR | 20140117346 A | 10/2014 |
| KR | 20160015541 A | 2/2016 |
| KR | 10-1697998 B1 | 1/2017 |
| KR | 20190138528 A | 12/2019 |
| KR | 20190140855 A | 12/2019 |
| KR | 10-2137257 B1 | 7/2020 |
| KR | 2021-0000679 A | 1/2021 |
| WO | 1992/012787 A1 | 8/1992 |
| WO | 2017/088845 A1 | 6/2017 |
| WO | 2020-262911 A1 | 12/2020 |
| WO | 2020 262912 A1 | 12/2020 |

OTHER PUBLICATIONS

European Search Report, dated Oct. 22, 2024.
KR NOA dated May 1, 2025.
JP OA dated Jul. 3,2024_JP Appln. No. 2023-546364.

\* cited by examiner

FUEL CELL MEMBRANE HUMIDIFIER

CROSS REFERENCE TO RELATED APPLICATION

This application is a National Stage filing under 35 U.S.C. 371 of International Application No. PCT/KR2022/003304 filed on Mar. 8, 2022 and claims priority to Korean Patent Application No. 10-2021-0032467 filed on Mar. 12, 2021, the disclosure of which is incorporated herein by reference in its entirety.

TECHNICAL FIELD

The present invention relates to a fuel cell membrane humidifier, and more specifically, to a fuel cell membrane humidifier in which coupling strength between a potting portion and an inner case is improved so that the coupling strength can be maintained even when a fuel cell is repeatedly operated and stopped.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a humidifier can be reduced.

A selective permeable membrane used in the membrane humidification scheme is preferably a hollow fiber membrane having a large permeable area per unit volume when a module is formed. That is, when a humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an off-gas discharged with a high temperature from the fuel cell can be recovered and can be reused through the humidifier.

As illustrated in FIG. 1, a typical membrane humidification type of humidifier 1000 includes a humidification module 1100 in which moisture exchange between air supplied from the outside and an off-gas discharged from a fuel cell stack (not illustrated) occurs, and caps 1200 coupled to both ends of the humidification module 110.

One of the caps 1200 transfers the air supplied from the outside to the humidification module 1100, and the other transfers the air humidified by the humidification module 1100 to the fuel cell stack.

The humidification module 1100 includes a mid-case 1110 having an off-gas inlet 1110a and an off-gas outlet 1110b, and at least one cartridge 100 disposed in the mid-case 1110. One cartridge is illustrated in the drawing. The cartridge 100 includes an inner case 1140, and a plurality of hollow fiber membranes 1120 and potting portions 1130 configured to fix both ends of a bundle of hollow fiber membranes 1120 are formed inside the inner case 1140. The potting portions 1130 are generally formed by curing a liquid polymer such as a liquid polyurethane resin through a casting scheme. The potting portions 1130 are generally formed by curing a liquid polymer such as a liquid polyurethane resin through a casting scheme (for example, dip casting or centrifugal casting).

A resin layer 1150 is formed between the cartridge 100 and the mid-case 1110, and the resin layer 1150 fixes the cartridge 100 to the mid-case 1110 and blocks inner spaces of the caps 1200 from an inner space of the mid-case 1110.

The air supplied from the outside flows along hollows of the hollow fiber membranes 1120. The off-gas flowing into the mid-case 1110 through the off-gas inlet 1110a flows into the cartridge 100 through a plurality of holes H included in the inner case 1140, comes into contact with outer surfaces of the hollow fiber membranes 1120, and then, is discharged from the mid-case 1110 through the off-gas outlet 1110b. When the off-gas comes into contact with the outer surfaces of the hollow fiber membranes 1120, moisture contained in the off-gas permeates the hollow fiber membranes 1120 to humidify air flowing along the hollows of the hollow fiber membranes 1120.

The inner spaces of the caps 1200 are in fluid communication only with hollows of the hollow fiber membranes 1120, and should be completely blocked from the inner space of the mid-case 1110. Otherwise, gas leakage occurs due to a pressure difference, and power generation efficiency of the fuel cell is degraded.

In such a cartridge 100 of the related art, since a side surface of the potting portion 1130 and a side surface of the inner case 1140 are in surface contact with each other, there is a problem that coupling strength is weakened due to a flow (a flow in a Z-direction) of a dry gas and the potting portion 1130 and the inner case 1140 are easily separated as the fuel cell is repeatedly operated and stopped.

DISCLOSURE

Technical Problem

An object of the present invention is to provide a fuel cell membrane humidifier in which coupling strength between a potting portion and an inner case is improved so that the coupling strength can be maintained even when a fuel cell is repeatedly operated and stopped.

In addition to the aspects of the present invention described above, other characteristics and advantages of the present invention will be described hereinafter or will be clearly understood by those skilled in the art from such description.

Technical Solution

The fuel cell membrane humidifier according to the embodiment of the present invention,
a humidification module configured to humidify air supplied from the outside with moisture in an off-gas discharged from a fuel cell stack; and caps coupled to both ends of the humidification module, respectively, wherein the humidification module includes at least one cartridge including an inner case, a plurality of hollow fiber membranes disposed inside the inner case, and potting portions configured to fix ends of the plurality of hollow fiber membranes, the potting portions being fitted into and coupled to ends of the inner case.

In the fuel cell membrane humidifier according to the embodiment of the present invention, the potting portion may include a potting body corresponding to a longitudinal direction of the inner case; a potting wing formed to extend in a lateral direction from an end of the potting body; and a potting protrusion formed to extend in a direction of the end of the inner case from the potting wing.

In the fuel cell membrane humidifier according to the embodiment of the present invention, an end groove formed in a shape corresponding to the potting protrusion may be formed at the end of the inner case.

In the fuel cell membrane humidifier according to the embodiment of the present invention, the potting protrusion may be fitted into and coupled to the end groove, the potting wing may cover the end of the inner case, and the potting body may be formed to come into surface contact with the inner case in the longitudinal direction of the inner case.

In the fuel cell membrane humidifier according to the embodiment of the present invention, the humidification module may include a mid-case having both open ends and a step formed on an inner circumferential surface; a fixing layer formed between the mid-case and the cartridge; a bracket supported by the step of the mid-case and coming into contact with the fixing layer; and a packing member having a groove into which the end of the mid-case is fitted, the packing member coming into contact with the bracket.

In the fuel cell membrane humidifier according to the embodiment of the present invention, a protrusion member fitted into the fixing layer to suppress vibration generated in the cartridge due to air flowing inside the humidification module may be formed on an inner wall of the packing member.

In the fuel cell membrane humidifier according to the embodiment of the present invention, a damping protrusion fitted into the fixing layer to suppress vibration generated in the cartridge due to air flowing inside the humidification module may be formed on an inner wall of the mid-case.

Other specific matters of implementation examples according to various aspects of the present invention are included in the detailed description below.

Advantageous Effects

According to the present invention, coupling strength between the potting portion and the inner case can be improved. Accordingly, the coupling strength may be maintained even when the fuel cell is repeatedly operated and stopped.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are used for the purpose of describing specific embodiments only and are not intended to limit the present invention. The singular expressions "a," "an" and "the" include the plural expressions, unless the context clearly indicates otherwise. It will be understood that the terms "include" or "have" herein specify the presence of features, numbers, steps, operations, components, parts or combinations thereof described herein, but do not preclude the presence or addition of one or more other features, numbers, steps, operations, components, parts or combinations thereof. Hereinafter, a fuel cell membrane humidifier according to embodiments of the present invention will be described with reference to the drawings.

Figure 1:
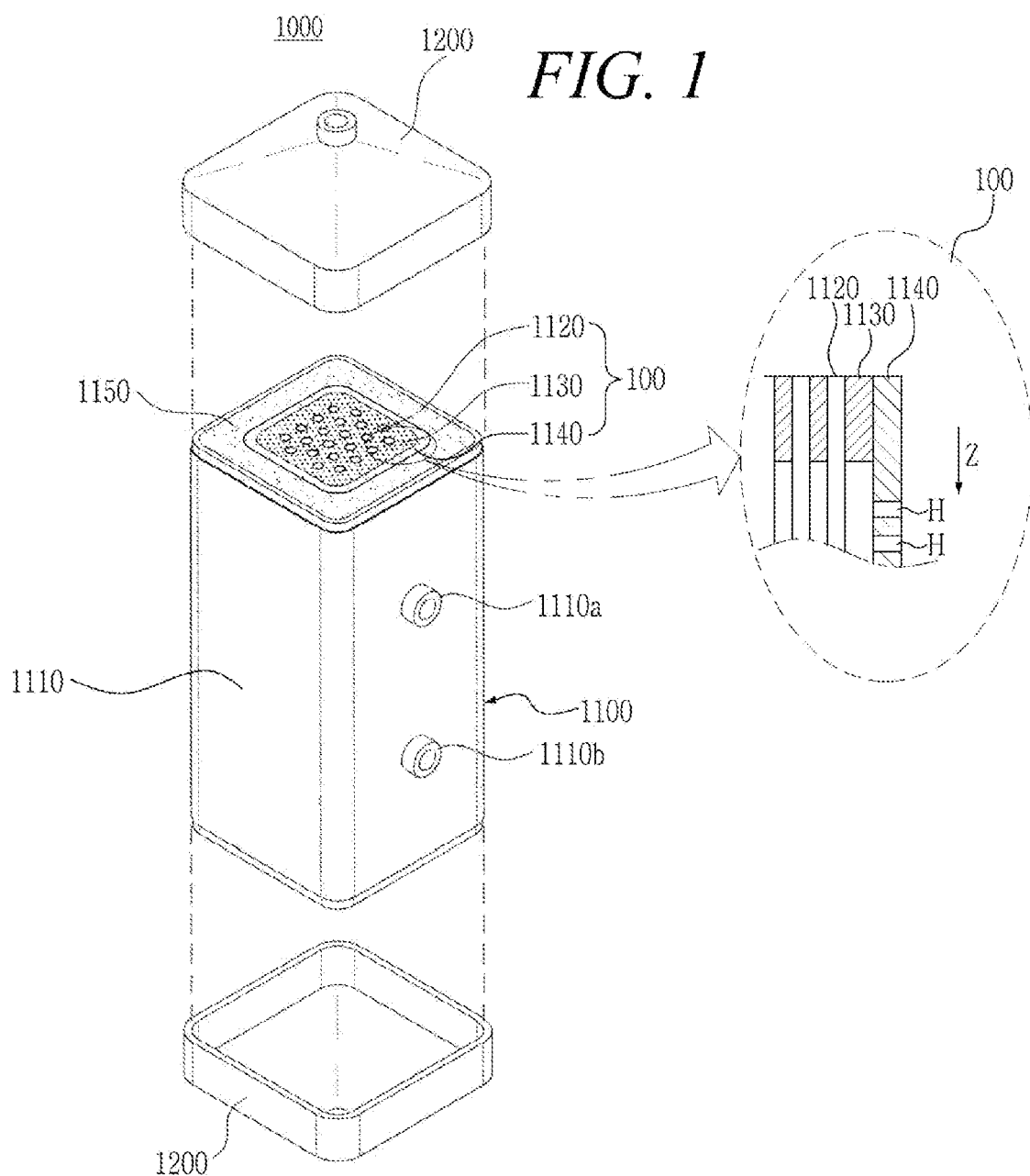
FIG. 1 is a view illustrating a fuel cell membrane humidifier according to the related art.
Figure 2:
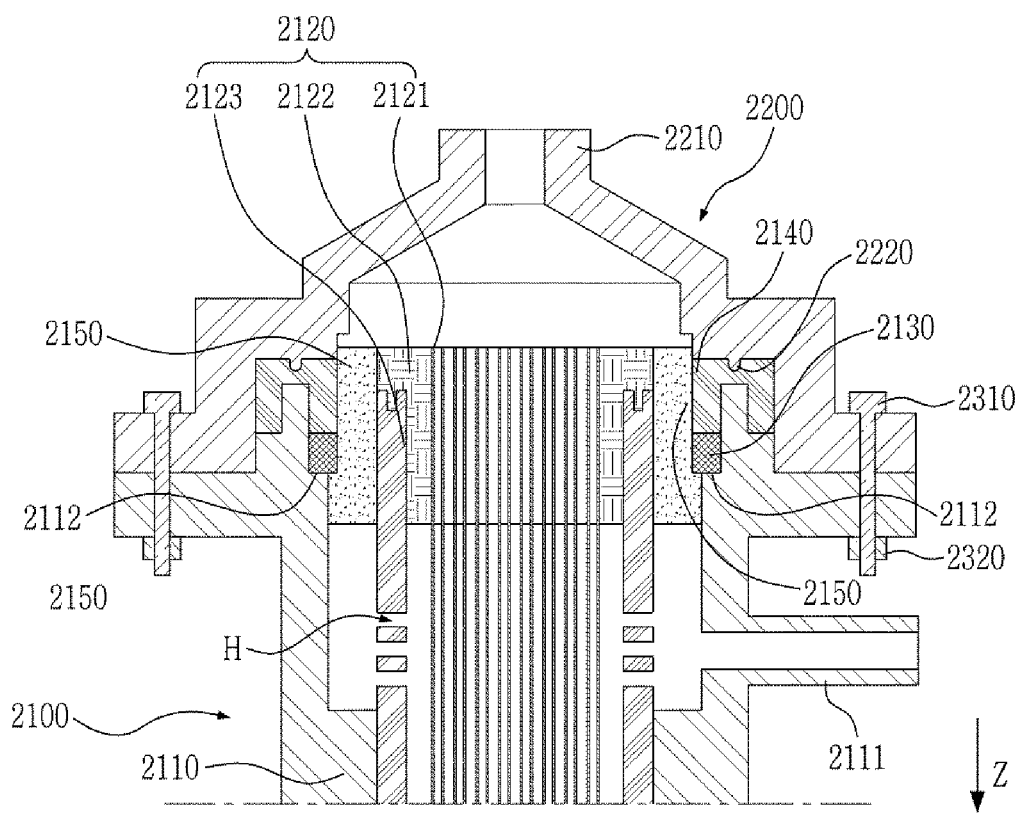
FIG. 2 is a view illustrating a fuel cell membrane humidifier according to a first embodiment of the present invention.

FIG. 2 is a view illustrating a fuel cell membrane humidifier according to a first embodiment of the present invention. A cross-sectional view of FIG. 2 is a cross-sectional view of one end of the humidifier or a semi-finished product thereof, and the other end also has substantially the same (or symmetrical) cross-section.

As illustrated in FIG. 2, the fuel cell membrane humidifier 2001 according to the first embodiment of the present invention includes a humidification module 2100 that humidifies air supplied from the outside with moisture in an off-gas discharged from a fuel cell stack. Both ends of the humidification module 2100 are fastened to caps 2200, respectively.

One of the caps 2200 receives the air supplied from the outside through a port 2210 and transfers the air to the humidification module 2100, and the other cap transfers the air humidified by the humidification module 2100 to the fuel cell stack through the port 2210. The caps 2200 may be formed of hard plastic (for example, polycarbonate, polyamide (PA) or polyphthalamide (PPA)) or a metal, and may have a cross section having a simple closed curve shape (for example, a circular or polygonal shape).

The humidification module 2100 includes a mid-case 2110 and a cartridge 2120 accommodated inside the mid-case 2110.

The mid-case 2110 includes ports 2111 (only one is illustrated in FIG. 2) for a flow of an off-gas into or from the inside. The mid-case 2110 may be formed of a rigid plastic (for example, polycarbonate, polyamide (PA), or polyphthalamide (PPA)) or a metal, and may have a cross section having a single closed curve shape (for example, a circular or polygonal shape). According to an embodiment of the present invention, the mid-case 2110 may have the same cross section as the cap 2200.

The cartridge includes hollow fiber membranes 2121, potting portions 2122, and an inner case 2123.

The hollow fiber membranes 2121 may include a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these. Air supplied from the outside through one of the caps 2200 is humidified while flowing along hollows of the hollow fiber membranes 2121, and then is transferred to the fuel cell stack through the other cap 2200.

The off-gas flowing into the mid-case 2110 comes into contact with outer surfaces of the hollow fiber membranes 2121 and then is discharged from the mid-case 2110. When the off-gas comes into contact with the outer surfaces of the hollow fiber membranes 2121, moisture contained in the off-gas permeates the hollow fiber membranes 2121 to humidify the air flowing along the hollows of the hollow fiber membranes 2121.

The potting portions 2122, which may be formed of a hard or soft polyurethane resin, block internal spaces of the caps 2200 from the inner space of the mid-case 2110 so that the caps 2200 can be in fluid communication only with the hollow fiber membranes 2121.

The inner case 2123 includes a plurality of holes H at positions corresponding to the ports 2111 (only one port is illustrated in FIG. 2) for a flow of an off-gas into or from the inside. An off-gas flowing into the mid-case 2110 through a first port 2111 passes through first holes H and then flows along the outer surfaces of the hollow fiber membranes 2121, thereby losing moisture. Subsequently, the off-gas exits the inner case 2133 through second holes H on the opposite side, and then, is discharged from the mid-case 2110 through a second port 2111.

However, in the cartridge 100 of the related art, since the side surface of the potting portion 1130 and the side surface of the inner case 1140 are in surface contact with each other, there is a problem that the coupling strength is weakened due to the flow (the flow in a Z-direction) of the dry gas and the potting portion 1130 and the inner case 1140 are easily separated as the fuel cell is repeatedly operated and stopped, as described above.

In order to prevent this problem, the cartridge 2120 in the fuel cell membrane humidifier 2001 of the present invention includes the potting portion 2122 fitted into and coupled to an end of the inner case 2123.

Figure 3:
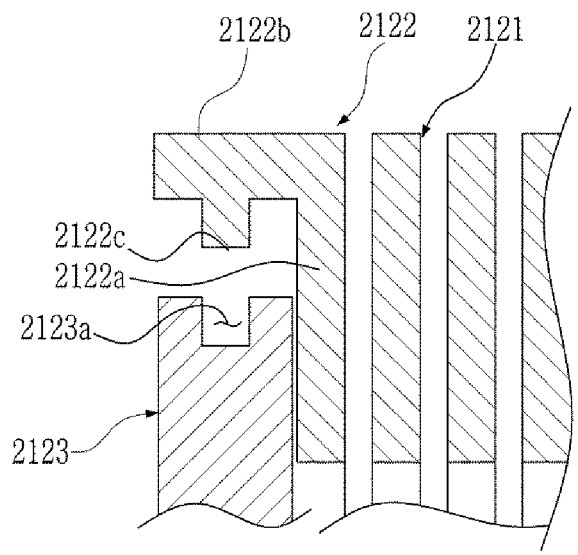
FIG. 3 is an enlarged cross-sectional view of a portion of a cartridge of the fuel cell membrane humidifier according to the first embodiment of the present invention.

This will be described with reference to FIG. 3. FIG. 3 is an enlarged cross-sectional view of a portion of the cartridge 2120 of the fuel cell membrane humidifier according to the first embodiment of the present invention.

As illustrated in FIG. 3, the cartridge 2120 includes the potting portion 2122 fitted into and coupled to the end of the inner case 2123.

The potting portion 2122 includes a potting body 2122a, a potting wing 2122b, and a potting protrusion 2122c. The potting portion 2122 having a shape as illustrated in FIGS. 2 and 3 may be formed by the end groove 2123a of the inner case 2123 being filled with a liquid potting agent when a method such as centrifugal potting is performed using the liquid potting agent in a state in which the inner case 2123 having the end groove 2123a is disposed.

The potting body 2122a has a predetermined length and is formed in a direction corresponding to a longitudinal direction (a Z-direction in FIG. 2) of the inner case 2123. The potting wing 2122b is formed to extend in a lateral direction from an end of the potting body 2122a. The potting wing 2122b is formed to cover the end of the inner case 2123. The potting protrusion 2122c is formed to extend in a direction of the end of the inner case 2123 from the potting wing 2122b.

An end groove 2123a formed in a shape corresponding to the potting protrusion 2122c is formed at the end of the inner case 2123. The potting protrusion 2122c may be fitted into and coupled to the end groove 2123a.

The potting protrusion 2122c is fitted into and coupled to the end groove 2123a, the potting wing 2122b covers the end of the inner case 2123, and the potting body 2122a is formed to come into surface contact with the inner case 2123 in the longitudinal direction of the inner case 2123.

According to such a cartridge of the fuel cell membrane humidifier according to the embodiment of the present invention, the potting wing 2122b is formed to cover the end of the inner case 2123 so that a side of the potting portion 2122 and a side of the inner case 2123 can be prevented from being influenced by a flow in the Z-direction of the dry gas.

Further, the potting protrusion 2122c is fitted into and coupled to the end groove 2123a of the inner case 2123 to improve coupling strength between the potting portion 2122 and the inner case 2123.

A fixing layer 2150 is formed between the cartridge 2120 and the mid-case 2110, and the fixing layer 2150 fixes the cartridge 2120 to the mid-case 2110 and blocks the inner spaces of the caps 2200 from the inner space of the mid-case 2110.

The fuel cell membrane humidifier 2001 according to the first embodiment of the present invention may further include a bracket 2130 and a packing member 2140.

As illustrated in FIG. 2, the bracket 2130 supported by a step 2112 of the mid-case 2110 may have a single closed curve shape corresponding to a cross-sectional shape of the mid-case 2110.

According to the embodiment of the present invention, the bracket 2130 has a higher hardness than the packing member 2140 and is strongly adhered to the potting portion 2122.

For example, the packing member 2140 may have a relatively low hardness of 30 to 60 Shore A and, more preferably, 40 to 50 Shore A so that the packing member 2140 can be compressed by a pressure that is applied when the cap 2200 is fastened to the mid-case 2110 through bolts 2310 and nuts 2320, and the bracket 2130 may have a hardness of 60 to 100 Shore A and, more preferably, 70 to 100 Shore A, which is higher than the hardness of the packing member 2140.

As illustrated in FIG. 2, the packing member 2140 into which an end of the mid-case 2110 is fitted may also have a single closed curve shape corresponding to the cross-sectional shape of the mid-case 2110.

According to the embodiment of the present invention, the packing member 2140 may include soft rubber (for example, silicone rubber or urethane rubber), and the bracket 2130 may include a metal, hard plastic (for example, polypropylene (PP), polyethylene terephthalate (PET), polystyrene (PS), polycarbonate (PC), or acrylic resin), or hard rubber.

When the cap 2200 is fastened to the mid-case 2110 through the bolts 2310 and the nuts 2320, a portion of the packing member 2140 disposed between the cap 2200 and the mid-case 2110 (particularly, a portion of the packing member 2140 corresponding to the groove into which the end of the mid-case 2110 is fitted) is compressed by pressure applied by the cap 2200 and the mid-case 2110, so that a movement (that is, external leakage) of a gas through an interface between the packing member 2140 and the mid-case 2110 can be prevented and external tight sealing can be ensured.

Further, since the bracket 2130 is supported by the step 2112 of the mid-case 2110 and has a relatively high hardness, the bracket 2130 can effectively apply pressure to the packing member 2140 together with the cap 2200 when the cap 2200 is fastened to the mid-case 2110 through the bolts 2310 and the nuts 2320. As a result, a portion of the packing member 2140 disposed between the cap 2200 and the bracket 2130 (that is, located inside the mid-case 2110) is sufficiently compressed so that a movement (that is, internal leakage) of the gas through an interface between the packing member 2140 and the bracket 2130 can be prevented and excellent internal sealing can be ensured.

Further, the bracket 2130 according to the embodiment of the present invention has an excellent adhesion to the potting portion 2122 so that a movement (that is, internal leakage) of the gas through an interface between the bracket 2130 and the potting portion 2122 can be prevented and more excellent internal sealing can be provided. A surface of the bracket 2130 is treated with a primer if necessary, so that an adhesive strength between the bracket 2130 and the potting portion 2122 can be further improved and an internal sealing effect can be maximized.

The cap 2200 may have a cap protrusion 2220 at a position corresponding to the end of the mid-case 2110 inserted into the groove of the packing member 2140. The cap protrusion 2220 more effectively compresses the packing member 2140 together with the end of the mid-case 2110, thereby enabling external tighter sealing.

Next, a fuel cell membrane humidifier 2002 according to a second embodiment of the present invention will be described with reference to FIG. 4.

Figure 4:
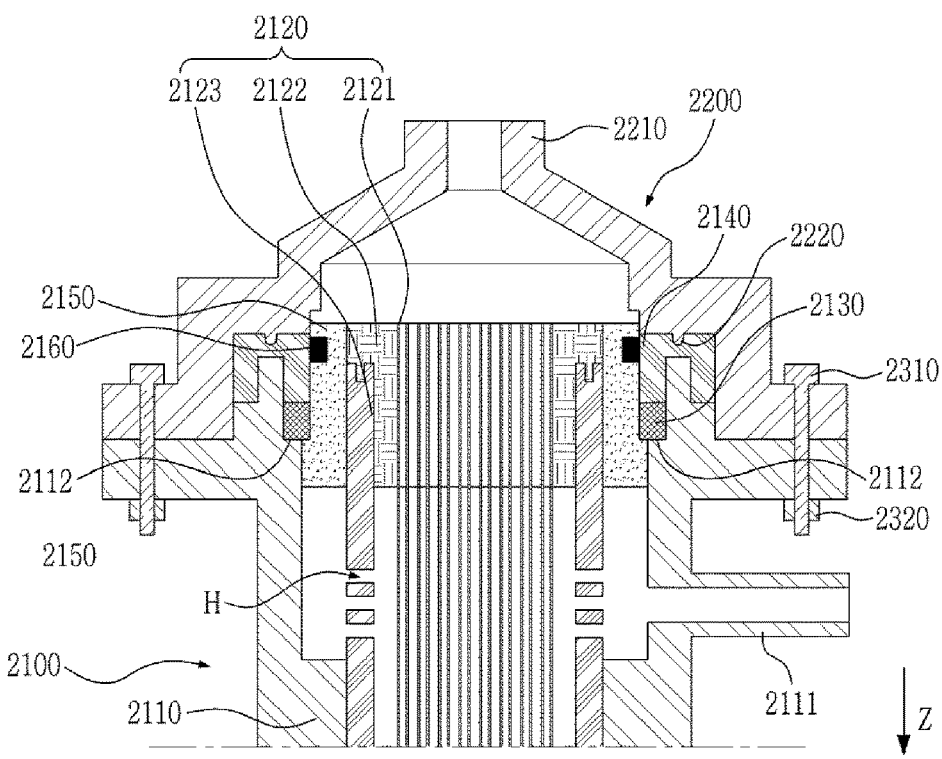
FIG. 4 is a view illustrating a fuel cell membrane humidifier according to a second embodiment of the present invention.

As illustrated in FIG. 4, the fuel cell membrane humidifier 2002 according to the second embodiment of the present invention further includes a protrusion member 2160, in addition to the fuel cell membrane humidifier 2001 of the first embodiment.

The protrusion member 2160 is formed to protrude in a direction of a fixing layer 2150 from an inner wall of a packing member 2140. The protrusion member 2160 may be formed in an annular ring shape surrounding the inner wall of the packing member 2140. In manufacturing, the protrusion member 2160 may be fitted into the fixing layer 2150 in a pressurized manner.

The protrusion member 2160 is fitted into the fixing layer 2150 in a pressurized manner to compress the fixing layer 2150, thereby suppressing a movement of air inside the mid-case 2110 toward a cap 2200 and enabling internal tighter sealing.

Further, the protrusion member 2160 is fitted into the fixing layer 2150 in a pressurized manner to compress the fixing layer 2150, thereby suppressing vibration generated in a cartridge 2120 due to air flowing inside a humidification module 2100. That is, the protrusion member 2160 can suppress vibration of the cartridge 2120 in a Z-axis direction due to a flow (the Z-axis direction) of dry air flowing into the inside through a port 2210 of the cap.

Further, since the protrusion member 2160 is formed to protrude in a direction of the fixing layer 2150 from the inner wall of the mid-case 2110, it is possible to easily position the fixing layer when the fixing layer is formed in a manufacturing process.

Next, a fuel cell membrane humidifier 2003 according to a third embodiment of the present invention will be described with reference to FIG. 5.

Figure 5:
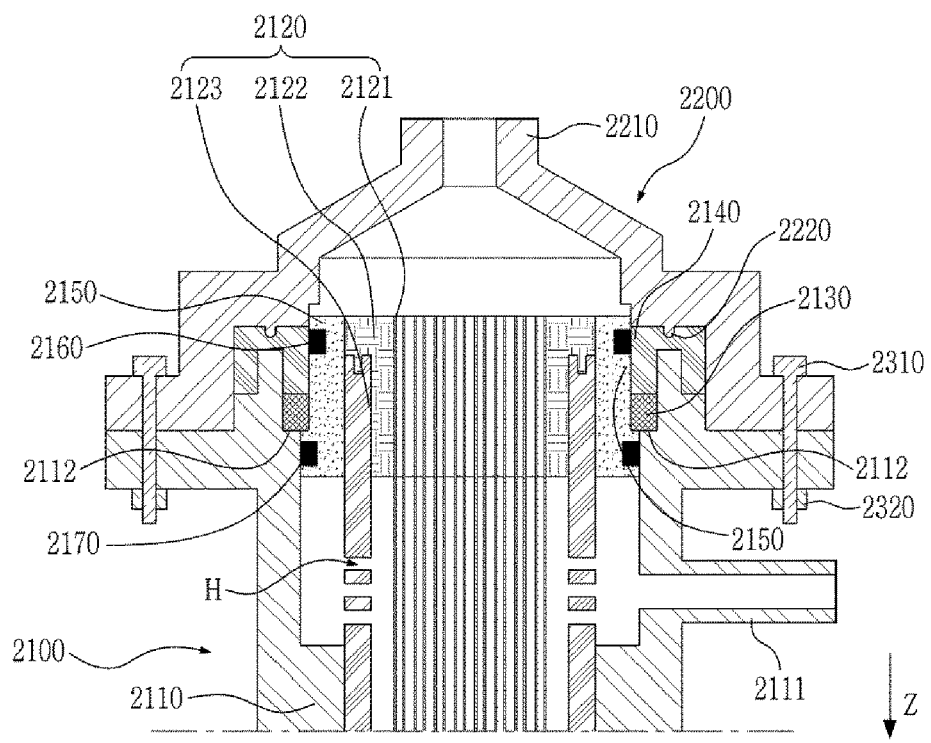
FIG. 5 is a view illustrating a fuel cell membrane humidifier according to a third embodiment of the present invention.

As illustrated in FIG. 5, the fuel cell membrane humidifier 2003 according to the third embodiment of the present invention further includes a damping protrusion 2170, in addition to the fuel cell membrane humidifier 2001 or 2002 of the first embodiment or the second embodiment.

The damping protrusion 2170 is formed to protrude in a direction of a fixing layer 2150 from an inner wall of a mid-case 2110. The damping protrusion 2170 may be formed in an annular ring shape surrounding the inner wall of the mid-case 2110. In manufacturing, the damping protrusion 2170 may be fitted into the fixing layer 2150 in a pressurized manner.

The damping protrusion 2170 is fitted into the fixing layer 2150 in a pressurized manner to compress the fixing layer 2150, thereby suppressing a movement of air inside the mid-case 2110 toward a cap 2200 and enabling internal tighter sealing.

Further, the damping protrusion 2170 is fitted into the fixing layer 2150 in a pressurized manner to compress the fixing layer 2150, thereby suppressing vibration generated in a cartridge 2120 due to air flowing inside the humidification module 2100. That is, the damping protrusion 2170 can suppress vibration of the cartridge 2120 in a Z-axis direction due to a flow (the Z-axis direction) of dry air flowing into the inside through a port 2210 of the cap. Further, since the damping protrusion 2170 is formed to protrude in a direction of the fixing layer 2150 from the inner wall of the mid-case 2110, it is possible to easily position the fixing layer when the fixing layer is formed in a manufacturing process.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

Detailed Description of Main Elements 2001, 2002, 2003: fuel cell membrane humidifier
2100: humidification module 2110: mid-case
2120: cartridge 2121: hollow fiber membrane
2122: potting portion 2122a: potting body
2122b: potting wing 2122c: potting protrusion
2123: inner case 2130: bracket
2140: packing member 2150: fixing layer
2160: protrusion member 2170: damping protrusion

The invention claimed is:

1. A fuel cell membrane humidifier comprising:
a humidification module configured to humidify air supplied from an outside of the humidifier with moisture in an off-gas discharged from a fuel cell stack; and
caps coupled to both ends of the humidification module, respectively,
wherein the humidification module includes
at least one cartridge including an inner case, a plurality of hollow fiber membranes disposed inside the inner case, and potting portions configured to fix ends of the plurality of hollow fiber membranes, the potting portions being fitted into and coupled to ends of the inner case,
wherein at least one of the potting portions includes:
a potting body formed to extend in a longitudinal axis of the inner case;
a potting wing formed to extend in a lateral direction from an end of the potting body; and
a potting protrusion formed to extend toward one of the ends of the inner case from the potting wing,
wherein an end groove formed in a shape corresponding to the potting protrusion is formed at said one end of the inner case,
wherein the potting protrusion is fitted into and coupled to the end groove, the potting wing covers said one end of the inner case, and the potting body is formed to come into surface contact with the inner case in the longitudinal axis of the inner case.

2. The fuel cell membrane humidifier of claim 1, wherein the humidification module includes
a mid-case having opposite open ends and a step formed on an inner circumferential surface;
a fixing layer formed between the mid-case and the cartridge;
a bracket supported by the step of the mid-case and coming into contact with the fixing layer; and
a packing member having a groove into which the end of the mid-case is fitted, the packing member coming into contact with the bracket.

3. The fuel cell membrane humidifier of claim 2, wherein a protrusion member fitted into the fixing layer to suppress vibration generated in the cartridge due to air flowing inside the humidification module is disposed on an inner wall of the packing member.

4. The fuel cell membrane humidifier of claim 2, wherein a damping protrusion fitted into the fixing layer to suppress vibration generated in the cartridge due to air flowing inside the humidification module is disposed on an inner wall of the mid-case.

* * * * *